US008560700B2

(12) United States Patent
Xie (10) Patent No.: US 8,560,700 B2
(45) Date of Patent: Oct. 15, 2013

(54) IMS MEDIA CODEC NEGOTIATION METHOD AND SYSTEM

(75) Inventor: Zhenhua Xie, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 13/258,367

(22) PCT Filed: Dec. 21, 2009

(86) PCT No.: PCT/CN2009/075779
§ 371 (c)(1),
(2), (4) Date: Apr. 16, 2012

(87) PCT Pub. No.: WO2010/145147
PCT Pub. Date: Dec. 23, 2010

(65) Prior Publication Data
US 2012/0198068 A1      Aug. 2, 2012

(30) Foreign Application Priority Data
Oct. 17, 2009  (CN) .......................... 2009 1 0174825

(51) Int. Cl.
*G06F 15/173* (2006.01)
(52) U.S. Cl.
USPC ............. 709/226; 725/80; 370/352; 370/401; 455/418
(58) Field of Classification Search
USPC ............. 709/226; 725/80, 133, 141; 455/418; 375/240; 370/352, 401, 467
See application file for complete search history.

(56) References Cited

U.S. PATENT DOCUMENTS

| 7,295,608 B2 * | 11/2007 | Reynolds et al. ........ 375/240.01 |
| 7,468,983 B2 | 12/2008 | Requena et al. |
| 8,036,234 B2 * | 10/2011 | Belling et al. ................ 370/401 |

(Continued)

FOREIGN PATENT DOCUMENTS

| CN | 101114985 A | 1/2008 |
| CN | 101184271 A | 5/2008 |

(Continued)

OTHER PUBLICATIONS

International Search Report in international application No. PCT/CN2009/075779, mailed on Jul. 29, 2010.
English Translation of the Written Opinion of the International Search Authority in international application No. PCT/CN2009/075779, mailed on Jul. 29, 2010.

*Primary Examiner* — Frantz Jean
(74) *Attorney, Agent, or Firm* — Oppedahl Patent Law Firm LLC (57) ABSTRACT

The present disclosure provides an IMS media codec negotiation method, which is used in an IMS network. The method comprises: when forwarding a media resource request, a first signaling media network element carries a media address of a second media gateway and a codec supported by the second media gateway into the media resource request, wherein the second media gateway is controlled by the first signaling media network element and is used for code transition; when receiving a media resource response, the first signaling media network element takes the second media gateway as a node of a media path in the case that the media resource response information related to the second media gateway. An IMS media codec negotiation system is also provided by the present disclosure. The method and system mentioned in the present disclosure can realize media codec negotiation via interaction of the media resource request and response for only one time, therefore, the signaling overhead is reduced, and the user experience is improved.

16 Claims, 4 Drawing Sheets

(56) References Cited

U.S. PATENT DOCUMENTS

| | | |
|---|---|---|
| 2002/0181495 A1 | 12/2002 | Requena et al. |
| 2007/0053343 A1* | 3/2007 | Suotula et al. ................ 370/352 |
| 2007/0291106 A1* | 12/2007 | Kenrick et al. ............ 348/14.01 |
| 2009/0232147 A1* | 9/2009 | Belling et al. ................ 370/401 |
| 2009/0286523 A1* | 11/2009 | Cotevino et al. .............. 455/418 |
| 2009/0290573 A1 | 11/2009 | Belling |
| 2010/0093346 A1 | 4/2010 | Song et al. |

FOREIGN PATENT DOCUMENTS

| | | |
|---|---|---|
| CN | 101292497 A | 10/2008 |
| WO | 02096145 A1 | 11/2002 |
| WO | 2008084911 A1 | 7/2008 |

* cited by examiner

Fig. 3

IMS MEDIA CODEC NEGOTIATION METHOD AND SYSTEM

TECHNICAL FIELD

The present disclosure relates to the field of Internet Protocol (IP) Multimedia Core Network Subsystem (IMS), more particularly to an IMS media codec negotiation method and system.

BACKGROUND

Internet Protocol Multimedia Core Network Subsystem (IMS) is an IP-based network framework put forward by the $3^{rd}$ Generation Partnership Project (3GPP), which constructs an open and flexible service environment supporting multimedia application and is capable of providing rich multimedia services for users.

In the IMS service system, a control layer is separated from a service layer. The control layer does not provide specific services and only provides necessary functions such as triggering, routing and billing etc. to the service layer. The service triggering and control function of the control layer is implemented by Call Session Control Function (CSCF). There are three types of CSCFs, namely Proxy CSCF (P-CSCF), Interrogating CSCF (I-CSCF) and Serving CSCF (S-CSCF), wherein the I-CSCF is optional. The service layer comprises a series of Application Servers (AS) which can provide specific services, wherein an AS may be an independent entity or may exist in the S-CSCF. The control layer controls service triggering according to the subscription information of a user, schedules the services on the AS and realizes the service function. The end-to-end equipment during the session is referred to as a User Equipment (UE), which is responsible for interacting with the user. There are further various of network elements for processing IMS signaling and media gateways controlled by the network elements in the IMS network, such as P-CSCF and an Access GateWay (AGW) controlled by the P-CSCF, Interworking Border Control Function (I-BCF) and the Interworking Border GateWay (I-BGW) controlled by the I-BCF, Session Border Control (SBC), Application Layer Gateway (ALG), etc. One of the functions of these network elements is to provide media forwarding and code transition functions through the media gateways controlled by the network elements respectively, to enable UEs supporting the same codec to perform direct media forwarding, and to enable UEs supporting different codec to realize media data interaction via the code transition function provided by the gateway. In order to simplify the description, in the present disclosure, the gateway equipment used for processing IMS signaling and media is referred to as an IMS Application Layer Gateway (IMS-ALG) and a Transition GateWay (TrGW).

Figure 1:
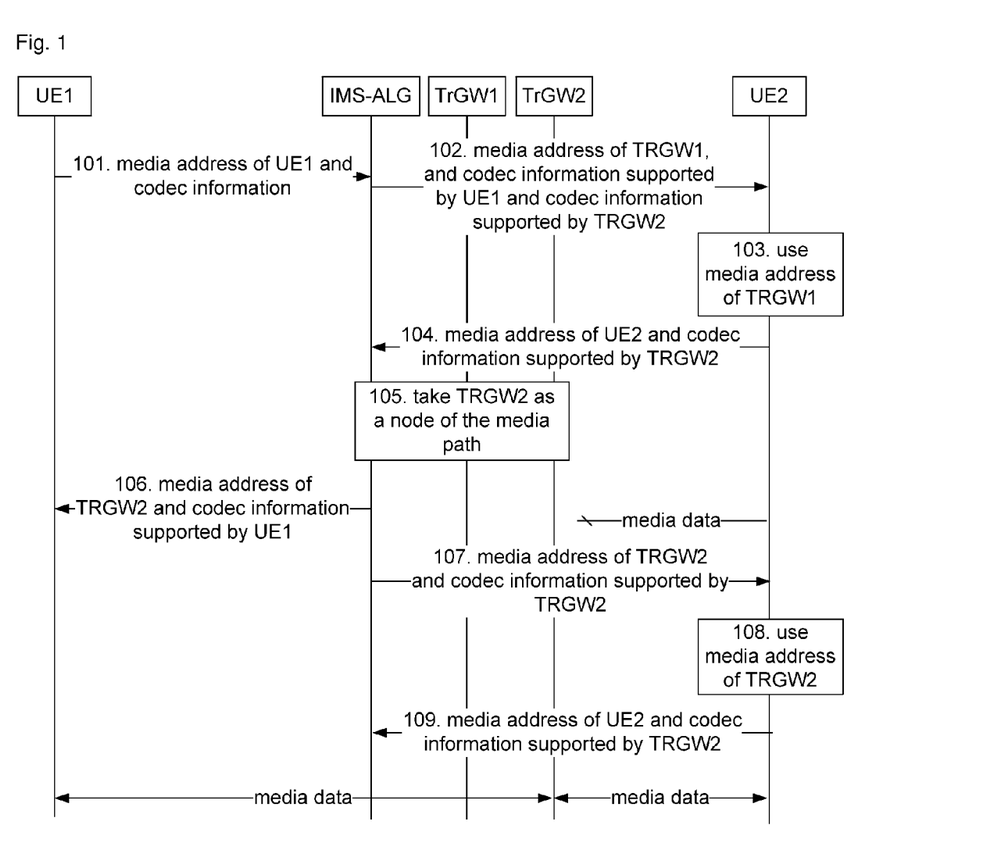
FIG. 1 shows a flowchart of negotiating signaling for the IMS media codec according to the prior art.

FIG. 1 shows a flowchart of negotiating signaling for the IMS media codec according to the prior art. As shown in FIG. 1, during the media negotiation process of a terminal, the network element providing the code transition function negotiates codec information and decides to start the code transition function according to the used codec information, wherein the signaling network element IMS-ALG providing the code transition function controls two media transition gateways, one of which is TrGW1 only responsible for forwarding media data and the other one is TrGW2 responsible for executing the code transition function during the forwarding process of the media data. The flow is described as follows.

Step 101: UE1 sends a media resource request to a remote terminal, which carries the media address (including the connection address and the receiving port number) of the UE1 and the codec information supported by the UE1.

The media address and the codec information is carried in the request in a following way: for example, the connection address of the UE1 is represented by the value of the "c=" row, the receiving port number of the UE1 and the supported codec code are recorded in the "m=" row, and the information such as the name and parameters of the codec supported by the UE1 are recorded in the "a=" row of the "m=" row.

The whole content of the media resource request is carried by a message body of a message such as the invitation message (INVITE), the re-invitation message (reINVITE), the update message (UPDATE) of the IMS signaling.

Step 102: after receiving the media resource request, the IMS-ALG modifies the media address therein into the media address of the TrGW1, adds the codec information supported by the TrGW2 into the media resource request (the added codec information does not include the codec information supported by the UE1, because the codec supported by the UE1 does not need the code transition function), and then forwards the media resource request; wherein the added codec information may also be recorded in the "m=" row and the "a=" row.

Step 103: after receiving the media resource request, the UE2 uses the media address of the TrGW1 according to both the information in the media resource request and the requirements of a standard, and then uses the codec information supported by the TrGW2 according to the codec information supported by the UE2 itself (e.g. all the codecs supported by the UE1 are not supported by the UE2).

Step 104: the UE2 sends a media resource response carried with the media address of the UE2 (including connection address and the receiving port number) and the codec information used by the UE2 and the codec information supported by the UE2.

For example, the connection address of the UE2 is represented by the value of the "c=" row, the receiving port number of the UE2, and the used and supported codec codes are recorded in the "m=" row, and the information such as the name and parameters of the codec used or supported by the UE2 are recorded in the "a=" row of the "m=" row. The codec used by the UE2 is arranged in the first position of the "m=" row and the corresponding first "a=" row; the codec information supported by the UE2 is arranged in other positions of the "m=" row.

The whole content of the media resource response is carried by a message body of a message such as the approval message (200 OK) of the IMS signaling.

Step 105: after receiving the media resource response, the IMS-ALG determines that the remote terminal has used the codec supported by the TrGW2, and decides to take TrGW2 as the node of the media path, i.e. the gateway connecting to the two parts of the media.

Step 106: the IMS-ALG modifies the media address in the received media resource response into the media address of the TrGW2, and modifies the codec information used in the media resource response into the information of a certain codec supported by the UE1, e.g. a first one of codecs of the UE1 received in Step 101, and then forwards the media resource response.

So far, the media negotiation is completed for the first time. The IMS-ALG acquires the media address of the UE1 and the UE2 acquires the media address of the IMS-ALG. The UE2 can send media data to the IMS-ALG, the IMS-ALG can forward media data to the UE1, and vice versa. However, the UE1 and the UE2 cannot perform interaction of media data, because the UE2 sends the coded media data to the TrGW1, while the TrGW1 does not provide the code transition function. Therefore, after the media data forwarded by the TrGW1 arrives at the UE1, the UE1 cannot parse the correct media data.

Step 107: simultaneous with Step 106, the IMS-ALG sends a new media resource request to the UE2, which carries the media address of the TrGW2 and the codec information supported by the TrGW2 (the added codec information does not include the codec information supported by the UE1, because the codec supported by the UE1 does not need the code transition function). The whole content of the new media resource request is carried by a message body of a message such as the re-invitation message (reINVITE) and the update message (UPDATE) of the IMS signaling.

Step 108: after receiving the new media resource request, the UE2 uses the media address of the TrGW2 according to both the information in the media resource request and the required standard, and selects to use the codec information of the TrGW2 according to the codec information supported by the UE2 itself.

Step 109: the UE2 sends a media resource response carried with the media address of the UE2 and the codec information used by the UE2 and the codec information supported by the UE2. The whole content of the media resource response is carried by a message body of a message such as the approval message (200 OK) of the IMS signaling.

Until now, the UE1 and the UE2 can realize media data interaction through the media code transition and forwarding function of the TrGW2.

The current IMS media codec negotiation method needs an extra interaction of media resource request and response, which increases the signaling overhead and may result in that, after a call is connected, there still needs a certain period of time for completing the extra signaling overhead until the call is really communicated.

SUMMARY

The technical problem to be solved by the present disclosure is to provide an IMS media codec negotiation method and system, used for IMS media code transition, which can avoid an extra signaling interaction, and does not need, after a call is connected, a certain period of time before the call is really communicated.

In order to solve the aforementioned problem, the present disclosure provides an IMS media codec negotiation method, comprising:

when forwarding a media resource request, a first signaling media network element carries a media address of a second media gateway and a codec supported by the second media gateway into a media resource request, wherein the second media gateway is controlled by the first signaling media network element and is used for code transition;

when receiving a media resource response, the first signaling media network element takes the second media gateway as a node of a media path in the case that the media resource response includes information related to the second media gateway.

The information related to the second media gateway may comprise: the codec supported by the second media gateway is selected, or the media address of the second media gateway is accepted.

When a media address of "m=" row in the media resource response corresponding to the second media gateway is set as a legal available address; or when an attribute "a=" row includes information indicating that the second media gateway is used, It may be indicated that the media address of the second media gateway is accepted.

Taking the second media gateway as the node of the media path node may comprise: modifying a media address in the media resource response into the media address of the second media gateway, then forwarding the media resource response.

The media address of the second media gateway and the codec supported by the second media gateway may be carried by the "m=" row and/or "a=" row in the media resource request.

The method may further comprise:
a second signaling media network element forwards the media resource request;

when forwarding the media resource response, the second signaling media network element uses the media address of the second media gateway in the case that the codec supported by the second media gateway is selected.

The method may further comprise:
before the second signaling media network element forwards the media resource request,
deleting the media address of the second media gateway carried in the media resource request.

The method may further comprise: when receiving the media resource request, a user equipment uses the media address of the second media gateway in the case that the codec supported by the second media gateway is selected.

An IMS media codec negotiation system comprises:
a first signaling media network element, configured to, when forwarding a media resource request, carry a media address of a second media gateway and a codec supported by the second media gateway into the media resource request, wherein the second media gateway is controlled by the first signaling media network element and is used for the code transition; and configured to take the second media gateway as a node of a media path when the first signaling media network element receives a media resource response and the media resource response includes information related to the second media gateway.

The information related to the second media gateway may comprise: the codec supported by the second media gateway is selected, or the media address of the second media gateway is accepted.

The first signaling media network element may be further configured to determine that the media address of the second media gateway is accepted when a media address of "m=" row in the media resource response corresponding to the second media gateway is set as a legal available address, or when an attribute "a=" row includes information indicating that the second media gateway is used.

The first signaling media network element may be further configured to modify a media address in the media resource response into the media address of the second media gateway, then forward the media resource response.

The first signaling media network element may be further configured to carry the media address of the media gateway and the codec supported by the second media gateway in the "m=" row and/or "a=" row in the media resource request.

The system may further comprise: a second signaling media network element, configured to forward the media resource request; and configured to, when forwarding the media resource response, use the media address of the second media gateway in the case that the codec supported by the second media gateway is selected.

The second signaling media network element may be further configured to, before forwarding the media resource request, delete the media address of the second media gateway carried in the media resource request.

The system may further comprise: a user equipment, configured to, when receiving the media resource request, use the media address of the second media gateway in the case that the codec supported by the second media gateway is selected.

The IMS media codec negotiation method and system provided by the present disclosure can realize media codec negotiation via interaction of the media resource request and response for only one time, therefore, the signaling overhead is reduced, and the user experience is improved.

DETAILED DESCRIPTION

The core idea of the present disclosure is that: when the IMS-ALG forwards a media resource request, the media resource request carries a media address of a media gateway which is controlled by the IMS-ALG and used for code transition.

The method of the present disclosure comprises: when forwarding a media resource request, a first signaling media network element carries a media address of a second media gateway, which is controlled by the first signaling media network element and is used for code transition, and a codec supported by the second media gateway into the media resource request;

when receiving a media resource response, the first signaling media network element takes the second media gateway as a node of a media path when the media resource response includes information related to the second media gateway.

The method of the present disclosure further comprises: a second signaling media network element forwards the media resource request; and, when forwarding the media resource response, the second signaling media network element uses the media address of the second media gateway in the case that the codec supported by the second media gateway is selected.

Figure 2:
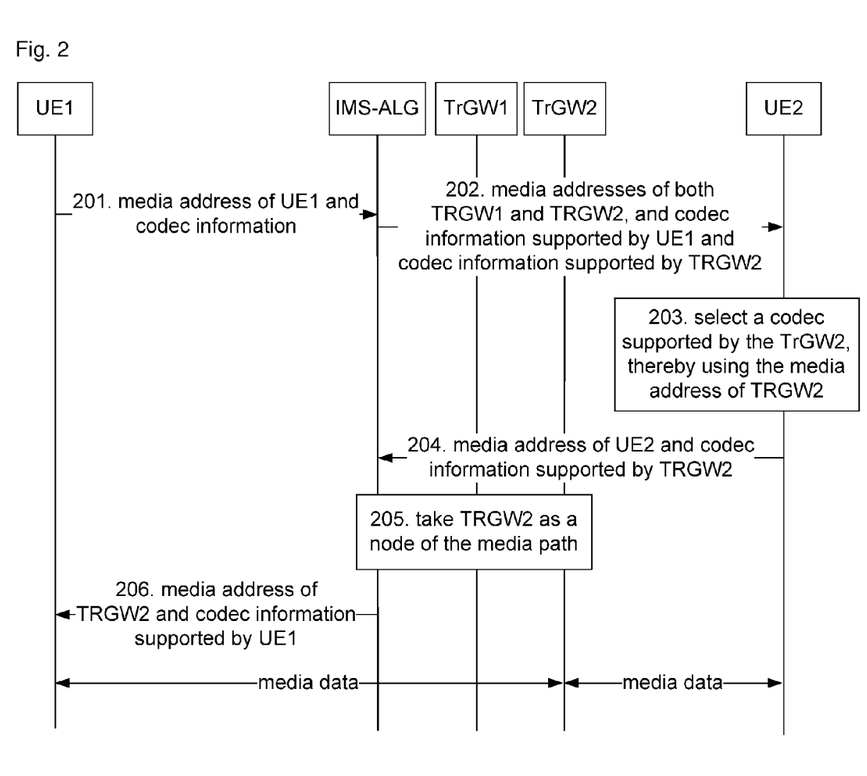
FIG. 2 shows a flowchart of negotiating signaling for the IMS media codec according to the present disclosure.

FIG. 2 shows a flowchart of negotiating signaling for the IMS media codec according to the present disclosure. As shown in FIG. 2, during the media negotiation process of a terminal, the network element providing the code transition function negotiates codec information and decides to start the code transition function according to the used codec information. The flow comprises the following steps.

Step 201: is completely the same as Step 101, thus is not repeated here;

Step 202: after receiving the media resource request, the IMS-ALG modifies the media address therein into the media address of the TrGW1, adds the codec information supported by the TrGW2 into the media resource request (the added codec information does not include the codec information supported by the UE1, because the codec supported by the UE1 does not need the code transition function), also adds the media address of the TrGW2 into the media resource request, and then forwards the media resource request.

The added codec information may be recorded in the "m=" row and the "a=" row, the added media address of the TrGW2 may be recorded in the "a=fmtp:" row of one or all of the codecs supported by the TrGW2.

The added codec information and the added media address of the TrGW2 may also be carried by an added "m=" row and an "a=" row related to the added "m=" row.

Step 203: after receiving the media resource request, the UE2 selects to use a codec supported by the TrGW2, thereby selecting to use the media address of the TrGW2.

Step 204: the UE2 sends a media resource response, the media resource response includes the media address of the UE2 (including the connection address and the receiving port number), the codec information supported by the UE2 and information related to the TrGW2, wherein the information related to the TrGW2 includes the used codec which is a codec supported by the TrGW2, and further includes an identification indicating that the media address of the TrGW2 is selected.

One of the following ways may used to indicate that the media address of TrGW2 is selected:

in the case that the added codec information and the added media address of the TrGW2 are carried by the added "m=" row and the "a=" row related to the "m=" row in the media resource request, then the media address of an "m=" row located at the same position with the added "m=" row in the media resource response is set as the media address of the UE2, otherwise represented by the attribute "a=" row in the media resource response.

Step 205: after receiving the media resource response, the IMS-ALG determines that the media resource response includes the information related to the TrGW2, then decides to take the TrGW2 as a node of the media path.

Step 206: the IMS-ALG modifies the media address in the received media resource response into the media address of the TrGW2 and modifies the used codec information therein into the information of certain codec information supported by the UE1, for example, a first one of codecs of the UE1 received in Step 201, and then forwards the media resource response.

So far, the UE1 and UE2 can realize media data interaction via the media code transition and forwarding function of the TrGW2.

The embodiment shown in FIG. 2 requires that the UE2 can support different media addresses. When the UE2 does not have this capability, it needs another IMS-ALG to help support different media addresses.

Corresponding to the method of the present disclosure, an IMS media codec negotiation system is provided. The IMS media codec negotiation system at least comprises a first signaling media network element, configured to, when forwarding a media resource request, carry a media address of a second media gateway and a codec supported by the second media gateway into the media resource request, wherein the second media gateway is controlled by the first signaling media network element and is used for the code transition; and configured to take the second media gateway as a node of a media path when the first signaling media network element receives a media resource response and the media resource response includes information related to the second media gateway.

The information related to the second media gateway comprises: the codec supported by the second media gateway is selected, or the media address of the second media gateway is accepted.

The first signaling media network element is specifically configured to determine that the media address of the second media gateway is accepted when a media address of "m=" row in the media resource response corresponding to the second media gateway is set as a legal available address, or when an attribute "a=" row includes information indicating that the second media gateway is used.

The first signaling media network element is specifically configured to modify a media address in the media resource response into the media address of the second media gateway, then forward the media resource response.

The first signaling media network element is specifically configured to carry the media address of the media gateway and the codec supported by the second media gateway in the "m=" row and/or "a=" row in the media resource request.

The system further comprises: a second signaling media network element, configured to forward the media resource request; and configured to, when forwarding the media resource response, use the media address of the second media gateway in the case that the codec supported by the second media gateway is selected. The second signaling media network element is further configured to, before forwarding the media resource request, delete the media address of the second media gateway carried in the media resource request.

The system further comprises: a user equipment, configured to, when receiving the media resource request, use the media address of the second media gateway in the case that the codec supported by the second media gateway is selected.

Figure 3:
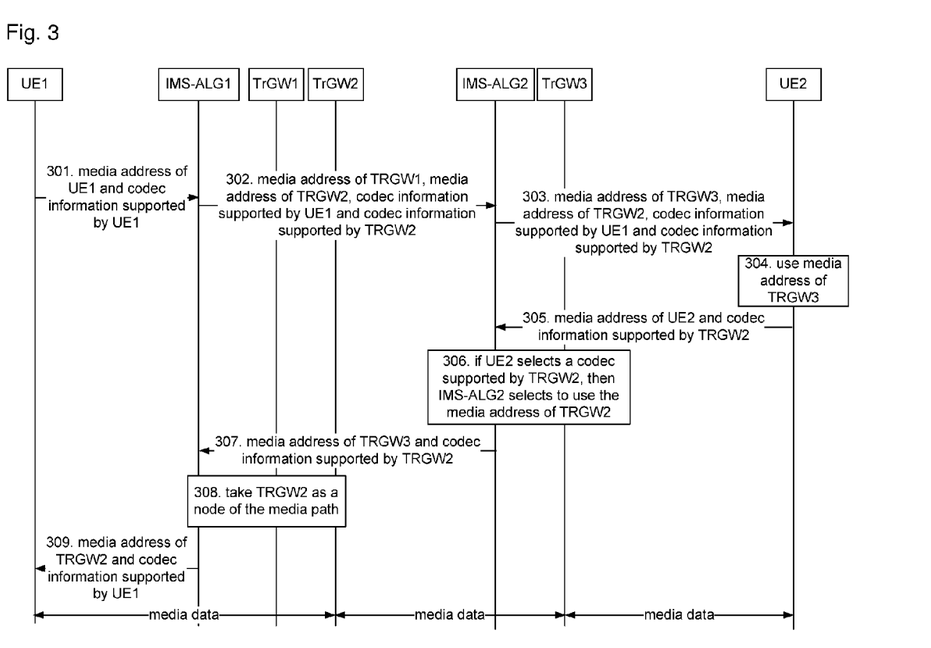
FIG. 3 shows a flowchart of negotiating signaling for the IMS media codec according to an embodiment of the present disclosure.
Figure 4:
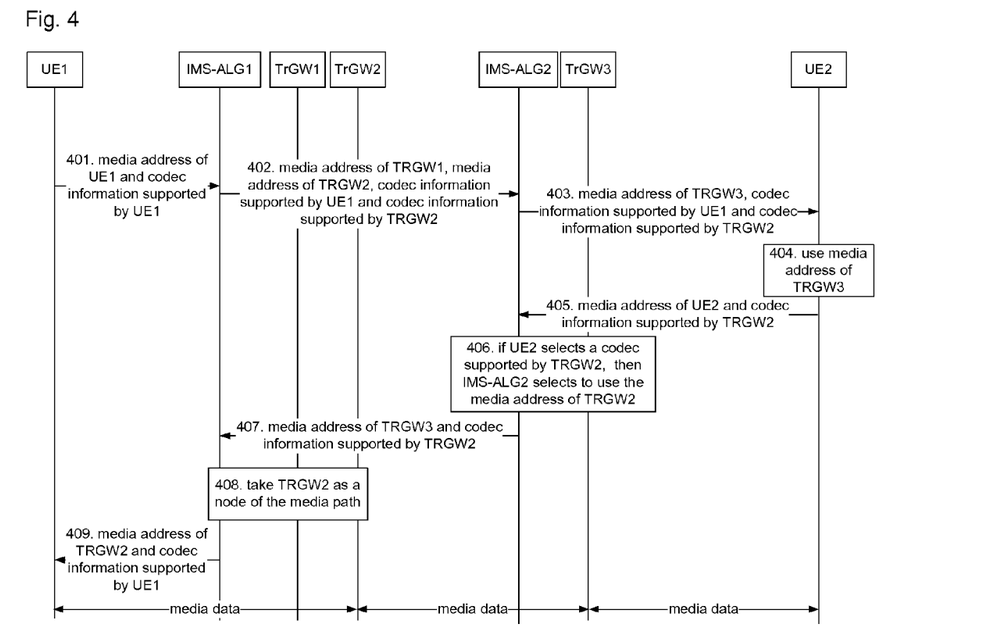
FIG. 4 shows a flowchart of negotiating signaling for the IMS media codec according to another embodiment of the present disclosure.

In the embodiments shown in FIG. 3 and FIG. 4, provided that there are two or more IMS-ALGs and media gateways respectively controlled by the IMS-ALGs in the signaling path. The IMS-ALG1 controls two media transition gateways, one of which is TrGW1 only responsible for forwarding media data and the other one is TrGW2 responsible for executing the code transition function during the forwarding process of the media data. The IMS-ALG2 is capable of assisting the UE to complete the codec negotiation, and it controls a media transition gateway TrGW3, which is only responsible for forwarding media data.

FIG. 3 shows a flowchart of negotiating signaling for the IMS media codec according to an embodiment of the present disclosure. As shown in FIG. 3, during the media negotiation process of a terminal, the network element providing the code transition function negotiates the codec information and decides to start the code transition function according to the used codec information. The flow comprises the following steps:

Step 301: is completely the same as Step 101 in FIG. 1, thus is not repeated here.

Step 302: after receiving the media resource request, the IMS-ALG1 modifies the media address therein into the media address of the TrGW1, adds the codec information supported by the TrGW2 into the media resource request (the added codec information does not include the codec information supported by the UE1, because the codec supported by the UE1 does not need the code transition function), also adds the media address of the TrGW2 into the request, and then forwards the media resource request.

The added codec information is recorded in the corresponding "m=" row and "a=" row and the added media address of the TrGW2 is recorded in the "a=fmtp:" row of the corresponding codec supported by the TrGW2.

Step 303: after receiving the media resource request, the IMS-ALG2 modifies the media address in the media resource request into the media address of the TrGW3, and then forwards the media resource request to the UE2.

Step 304: the UE2 receives the media resource request, since the UE is not extended to support the selection of different media addresses, the UE uses the media address of the TrGW3 according to the requirements of a standard, and the UE2 selects to use the codec information of the TrGW2 according to the codec information supported by the UE2.

Step 305: the UE2 sends a media resource response, the media resource response includes the media address of the UE2 (including the connection address and the receiving port number), the codec information supported by the UE2 and the information related to the TrGW2. Since the UE does not support the selection of different media addresses, the information related to the TrGW2 only includes the used codec is a certain codec supported by the TrGW2.

Step 306: after receiving the media resource response, the IMS-ALG2 determines that the UE2 has selected to use the codec supported by the TrGW2, and then selects to use the media address of the TrGW2. The IMS-ALG2 can indicate in the media resource response that the media address of the TrGW2 has been selected, how to indicate can refer to Step 204 of FIG. 2.

Step 307: the IMS-ALG2 modifies the media address in the received media resource response into the media address of the TrGW3, and then forwards the media resource response.

Step 308: after receives the media resource response, the IMS-ALG1 determines that the media resource response includes the information related to the TrGW2 and then decides to use the TrGW2 as a gateway to connect the two parts of the media.

Step 309: the IMS-ALG1 modifies the media address in the received media resource response into the media address of the TrGW2, and modifies the used codec information into the information of a certain codec supported by the UE1 e.g. a first one of codecs of the UE1 received in Step 301, and then forwards the media resource response.

So far, the UE1 and UE2 can realize media data interaction via the media forwarding function of TrGW3 and the media code transition and forwarding function of the TrGW2.

FIG. 4 shows a flowchart of negotiating signaling for the IMS media codec according to another embodiment of the present disclosure. As shown in FIG. 4, during the media negotiation process of a terminal, the network element providing the code transition function negotiates codec information and decides to start the code transition function according to the used codec information. The flow comprises the following steps:

Step 401: is completely the same as Step 101, thus is not repeated here.

Step 402: after receiving the media resource request, the IMS-ALG1 modifies the media address therein into the media address of the TrGW1, adds the codec information supported by the TrGW2 into the media resource request (the added codec information does not include the codec information supported by the UE1, because the codec supported by the UE1 does not need the code transition function), also adds the media address of the TrGW2 into the request, and then forwards the media resource request. The added codec information and the added media address of the TrGW2 are carried by an added "m=" row and an "a=" row related to the added "m=" row.

Step 403: after receiving the media resource request, the IMS-ALG2 deletes the added media address related to the TrGW2, combines the codec information related to the TrGW2 and the original codec information, modifies the media address of the TrGW1 into the media address of the TrGW3, and then forwards the media resource request to the UE2. For example, IMS-ALG2 deletes the "m=" row related to the TrGW2, and combines the codec information related to the deleted "m=" row and the original codec information in an "m=" row and an "a=" row related to the "m=" row, wherein the "m=" row is used for recording the media address of the TrGW3. Deletion of the "m=" row can prevent the terminal from receiving two media connections at the same time or refusing to accept two identical media connections.

Step 404-Step 409: are completely the same as Step 304-Step 309 in FIG. 3, thus are not repeated.

So far, the UE1 and UE2 can realize media data interaction via the media forwarding function of TrGW3 and the media code transition and forwarding function of the TrGW2.

The IMS media codec negotiation method provided by the present disclosure can realize media codec negotiation via interaction of the media resource request and response for only one time, therefore, the signaling overhead is reduced, and the user experience is improved.

Of course, the present disclosure may have a variety of other embodiments. Various changes and variations, without departing from the essence of the present disclosure, can be made by those skilled in the art according to the present disclosure, however, these changes and variations should be within the protection scope of the claims of the present disclosure.

The invention claimed is:

1. An IP multimedia core network subsystem media codec negotiation method, comprising:
    carrying, by a first signaling media network element, a media address of a second media gateway and a codec supported by the second media gateway, into a media resource request, when the first signaling media network element forwards the media resource request, wherein the second media gateway is controlled by the first signaling media network element and is used for code transition;
    taking, by the first signaling media network element, the second media gateway as a node of a media path, when the first signaling media network element receives a media resource response and the media resource response includes information related to the second media gateway.

2. The method according to claim 1, wherein the information related to the second media gateway comprises: the codec supported by the second media gateway is selected, or the media address of the second media gateway is accepted.

3. The method according to claim 2, wherein when a media address of "m=" row in the media resource response corresponding to the second media gateway is set as a legal available address; or
    when an attribute "a=" row includes information indicating that the second media gateway is used,
    it is indicated that the media address of the second media gateway is accepted.

4. The method according to claim 1, wherein taking the second media gateway as the node of the media path comprises:
    modifying a media address in the media resource response into the media address of the second media gateway, then forwarding the media resource response.

5. The method according to claim 1, wherein the media address of the second media gateway and the codec supported by the second media gateway are carried by the "m=" row and/or "a=" row in the media resource request.

6. The method according to claim 1, further comprising:
    forwarding, by a second signaling media network element, the media resource request;
    using the media address of the second media gateway in the case that the codec supported by the second media gateway is selected, when the second signaling media network element forwards the media resource response.

7. The method according to claim 6, further comprising:
    before the second signaling media network element forwards the media resource request,
    deleting the media address of the second media gateway carried in the media resource request.

8. The method according to claim 1, further comprising:
    using the media address of the second media gateway in the case that the codec supported by the second media gateway is selected, when a user equipment receives the media resource request.

9. An IP multimedia core network subsystem media codec negotiation system, comprising:
    a first IP multimedia core network subsystem-Application Layer Gateway (IMS-ALG), configured to, when forwarding a media resource request, carry a media address of a second media gateway and a codec supported by the second media gateway into the media resource request, wherein the second media gateway is controlled by the first IMS-ALG and is used for the code transition; and configured to take the second media gateway as a node of a media path when the first IMS-ALG receives a media resource response and the media resource response includes information related to the second media gateway.

10. The system according to claim 9, wherein the information related to the second media gateway comprises: the codec supported by the second media gateway is selected, or the media address of the second media gateway is accepted.

11. The system according to claim 10, wherein the first IMS-ALG is further configured to determine that the media address of the second media gateway is accepted when a media address of "m=" row in the media resource response corresponding to the second media gateway is set as a legal available address, or when an attribute "a=" row includes information indicating that the second media gateway is used.

12. The system according to claim 9, wherein the first IMS-ALG is further configured to modify a media address in the media resource response into the media address of the second media gateway, then forward the media resource response.

13. The system according to claim 9, wherein the first IMS-ALG is further configured to carry the media address of the media gateway and the codec supported by the second media gateway in the "m=" row and/or "a=" row in the media resource request.

14. The system according to claim 9, further comprising: a second signaling media network element, configured to forward the media resource request; and configured to, when forwarding the media resource response, use the media address of the second media gateway in the case that the codec supported by the second media gateway is selected.

15. The system according to claim 14, wherein the second signaling media network element is further configured to, before forwarding the media resource request, delete the media address of the second media gateway carried in the media resource request.

16. The system according to claim 9, further comprising:
    a user equipment, configured to, when receiving the media resource request, use the media address of the second media gateway in the case that the codec supported by the second media gateway is selected.

* * * * *